US007254589B2

(12) United States Patent
Goodwin et al.

(10) Patent No.: US 7,254,589 B2
(45) Date of Patent: Aug. 7, 2007

(54) APPARATUS AND METHOD FOR MANAGING AND INFERENCING CONTEXTURAL RELATIONSHIPS ACCESSED BY THE CONTEXT ENGINE TO ANSWER QUERIES RECEIVED FROM THE APPLICATION PROGRAM INTERFACE, WHEREIN ONTOLOGY MANAGER IS OPERATIONALLY COUPLED WITH A WORKING MEMORY

(75) Inventors: Richard Thomas Goodwin, Dobbs Ferry, NY (US); Fenno F. Heath, III, Woodbridge, CT (US); Juhnyoung Lee, Yorktown Heights, NY (US); Hui Lei, Scarsdale, NY (US); Jenny S. Li, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 10/849,944

(22) Filed: May 21, 2004

(65) Prior Publication Data
US 2005/0262128 A1 Nov. 24, 2005

(51) Int. Cl.
*G06F 17/00* (2006.01)
(52) U.S. Cl. .......... 707/104.1; 707/3; 707/102
(58) Field of Classification Search .......... 707/1, 707/3–6, 10, 100, 102, 104.1, 200; 706/45–50; 705/1–2, 10, 26–27; 717/101–104; 715/514, 715/738
See application file for complete search history.

(56) References Cited
U.S. PATENT DOCUMENTS
5,768,580 A * 6/1998 Wical .......... 707/102

6,289,338 B1 * 9/2001 Stoffel et al. .......... 707/3
6,311,194 B1 * 10/2001 Sheth et al. .......... 715/505

(Continued)

FOREIGN PATENT DOCUMENTS
GB 2399665 * 9/2004 .......... 17/30

(Continued)

OTHER PUBLICATIONS

Yanmei Wang et al. "ontology-based web knowledge manaement", ICICS-PCM 2003, pp. 1859-1863.*

(Continued)

*Primary Examiner*—Srirama Channavajjala
(74) *Attorney, Agent, or Firm*—Whitham, Curtis, Christofferson & Cook, P.C.; Stephen C. Kaufman

(57) ABSTRACT

Standardized support for management of contextual relationships, which includes specification of the context hierarchy, association of relationships with a particular context, and derivation of transitive dependencies, is provided with a Context Manager service. The Context Manager provides a programmatic interface for defining contexts and the relationships therein. The Context Manager saves the relationship facts in one or more context stores, which are organized by contexts. The Context Manager interfaces with the Ontology Manager that processes queries on relationships with respect to a given set of contexts. The Context Manager provides a high-level abstraction for relationship management in a context. Developers of business solutions can then focus on the core business logic, without worrying about the details of storing and inferencing relationships.

19 Claims, 3 Drawing Sheets

U.S. PATENT DOCUMENTS

| | | | |
|---|---|---|---|
| 6,424,973 B1 * | 7/2002 | Baclawski | 707/102 |
| 6,513,059 B1 * | 1/2003 | Gupta et al. | 709/202 |
| 6,560,595 B1 * | 5/2003 | Sanders et al. | 707/2 |
| 6,640,231 B1 * | 10/2003 | Andersen et al. | 707/102 |
| 6,728,692 B1 * | 4/2004 | Martinka et al. | 706/45 |
| 6,892,238 B2 * | 5/2005 | Lee et al. | 709/224 |
| 6,957,214 B2 * | 10/2005 | Silberberg et al. | 707/4 |
| 7,027,974 B1 * | 4/2006 | Busch et al. | 704/4 |
| 2003/0018616 A1 * | 1/2003 | Wilbanks et al. | 707/2 |
| 2003/0233224 A1 * | 12/2003 | Marchisio et al. | 704/4 |
| 2004/0010491 A1 * | 1/2004 | Riedinger | 707/3 |
| 2004/0054690 A1 * | 3/2004 | Hillerbrand et al. | 707/104.1 |
| 2004/0117346 A1 * | 6/2004 | Stoffel et al. | 707/1 |
| 2004/0220893 A1 * | 11/2004 | Spivack et al. | 706/46 |
| 2005/0060371 A1 * | 3/2005 | Cohen et al. | 709/205 |
| 2005/0080656 A1 * | 4/2005 | Crow et al. | 705/8 |
| 2005/0138173 A1 * | 6/2005 | Ha et al. | 709/225 |
| 2005/0267871 A1 * | 12/2005 | Marchisio et al. | 707/3 |
| 2006/0218177 A1 * | 9/2006 | Chang et al. | 707/102 |

FOREIGN PATENT DOCUMENTS

| | | | | |
|---|---|---|---|---|
| WO | WO 01/15042 | * | 3/2001 | 17/60 |
| WO | WO 02/05137 | * | 1/2002 | 17/30 |
| WO | WO 02/31680 | * | 4/2002 | |
| WO | WO 02080028 | * | 10/2002 | 17/30 |
| WO | WO 02/099725 | * | 12/2002 | |
| WO | WO 2005/010653 | * | 2/2005 | |
| WO | WO 2006/020343 | * | 2/2006 | 17/30 |
| WO | WO 2006071928 | * | 7/2006 | 17/30 |

OTHER PUBLICATIONS

Wenjie Li et al. "ontology based intelligent information retrieval system", Canadian conference on electrical and computer engineering, 2004, vol. 1, pp. 373-376.*

Abilio Fernandes, SNOBASE, May 2004, 18 pages.*

Liu Jin et al. "A methodology for acquisition of software component attribute ontology", The fourth international conference on computer and information technology, 2004, pp. 1058-1064.*

Czejdo,B et al. "automatic generation of ontology based annotations in XML and theiruse in retrieval systems", proceedings of the first international conference on web information systems engineering, 2000, vol. 1, pp. 296-300.*

Deloule,F et al. "ontologies and knowledge representation", intelligent systems for the 21st century, IEEE international conference on systems, man and cybernetics, 1995, vol. 5, pp. 22-25.*

Bo Hu et al."ontology-based medical image annotation with description logics", proceedings, 15th IEEE internatinal conference on tools with artificial intelligence, 2003, pp. 77-82.*

Deborah,L McGuinness et al. "DAML+OIL: an ontology language for the semantic web", IEEE intelligent systems, 2002 pp. 72-80.*

* cited by examiner

APPARATUS AND METHOD FOR MANAGING AND INFERENCING CONTEXTUAL RELATIONSHIPS ACCESSED BY THE CONTEXT ENGINE TO ANSWER QUERIES RECEIVED FROM THE APPLICATION PROGRAM INTERFACE, WHEREIN ONTOLOGY MANAGER IS OPERATIONALLY COUPLED WITH A WORKING MEMORY

BACKGROUND OF THE INVENTION

1. Field of the Invention

The present invention generally relates to managing a large number and variety of resources in a business environment and, more particularly, to an apparatus and method which maintain the interrelationships between the resources and make inferences about such relationships.

2. Background Description

A business solution may encompass a large number and variety of resources that range from role players and information items to tasks and business artifacts. The appropriate behavior of the business solution often depends on a capability to maintain the interrelationships between the resources and to make inferences about such relationships. Consider the example of an integrated development environment (IDE). When a Java source file is updated, the IDE should automatically update many dependent files including the class file and the various archives (.jar, .war and .ear) that contain this class file. This requires that the IDE understand the dependencies among these files. Further, if the IDE supports contextual collaboration, it will present in an integrated collaboration window a collection of collaboration elements (team members, discussion threads, annotations, etc.) that is relevant to the developer's current task. Again, this implies the need for proper relationship management.

A relationship is meaningful only within a certain context or scope. Further, contexts can be nested and form a hierarchy. Relationships valid in one context should also hold in a nested context. Proper relationship management must enable specification of the context hierarchy and association of relationships with a particular context. Unfortunately, there is no standardized support for such relationship managements. As a result, business solutions have to manage resource relationships in their own ad hoc manner, incurring a lot of costs in developing, deploying and maintaining solutions.

SUMMARY OF THE INVENTION

It is therefore an object of the present invention to provide standardized support for management of contextual relationships which includes specification of the context hierarchy, association of relationships with a particular context, and derivation of transitive dependencies.

According to the invention, the prior art is improved upon by providing a Context Manager service. The Context Manager provides a programmatic interface for defining contexts and the relationships therein. The Context Manager saves the relationship facts in one or more context stores, which are organized by contexts. The Context Manager interfaces with the Ontology Manager that processes queries on relationships with respect to a given set of contexts.

The Context Manager provides a high-level abstraction for relationship management in a context. Developers of business solutions can then focus on the core business logic, without worrying about the details of storing and inferencing relationships.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
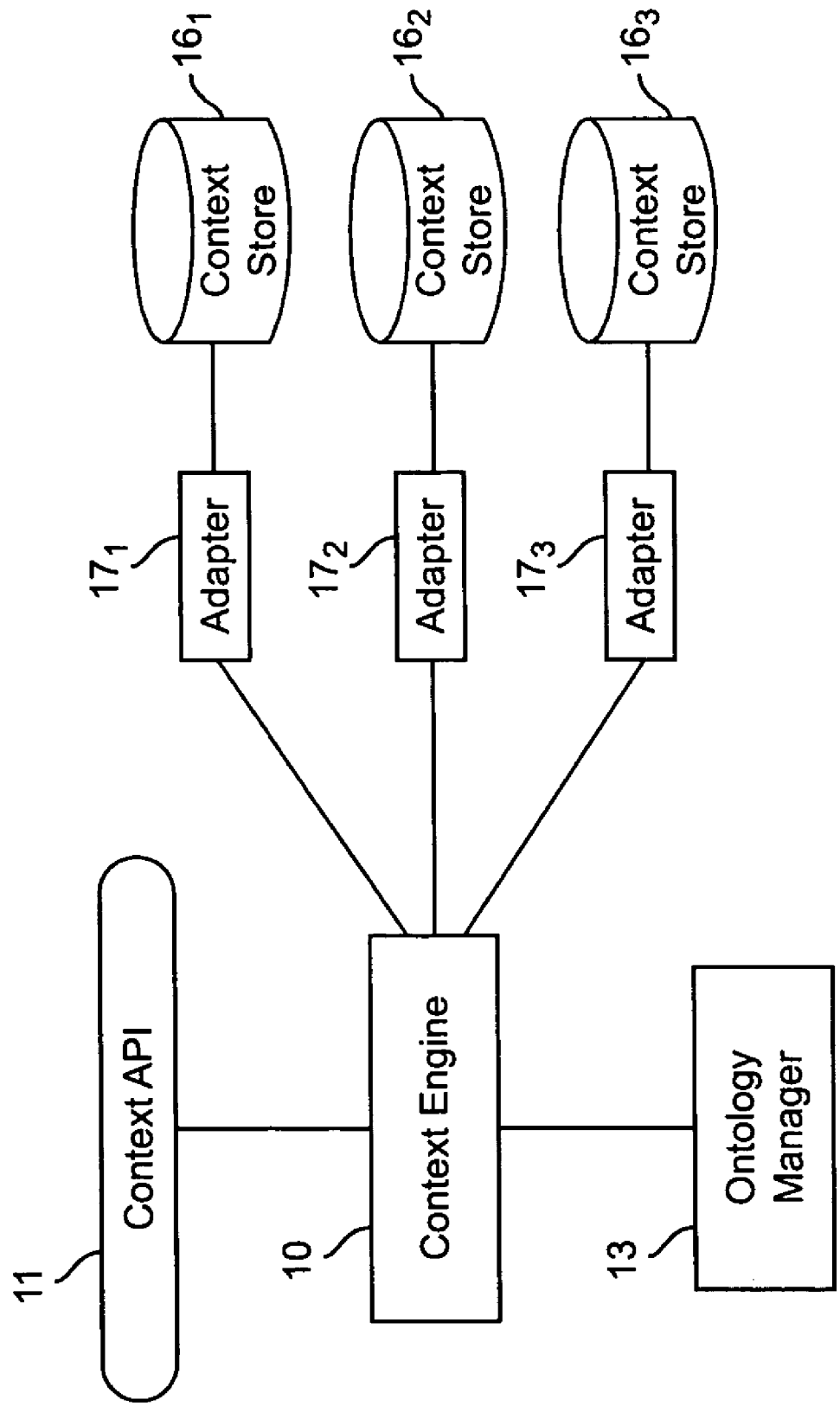
FIG. 1 is a block diagram illustrating the architecture of the Context Manager.

Referring now to the drawings, and more particularly to FIG. 1, there is shown the architecture of the Context Manager according to the invention. The heart of the Context Manager is the context engine 10 that receives input from the application program interface (API) 11 and interfaces with an ontology manager 13. The API 11 provides the interface for defining and querying about contextual relationships. The API 11 receives application requests for managing and inferencing contextual relationships. Its function is to create and remove context, link context and ontology definitions, add and remove resources and interrelationships in and from context, and retrieve resource relationships. The context engine 10 processes the application requests. Depending on the incoming requests, the context engine 10 may consult the ontology manager 13 to query about contextual relationships if necessary. In this example, context engine 10 interfaces with one or more context stores $16_1$, $16_2$ and $16_3$ via adapters $17_1$, $17_2$ and $17_3$, respectively, for contextual relationships.

Contexts are a mechanism to scope resource relationships, including relationships between collaboration elements and business operational artifacts. Example of collaboration elements can be a contract negotiator and example of business operational artifacts can be a contract document. Resources and their interrelationships are specified with respect to a particular context.

The Context Manager contains a context engine 10 that processes all the requests from the API 11. The API is a high-level abstraction for relationship management in a context. Developers of business solutions can then focus on the core business logic, without worrying about the details of storing and inferencing resource relationships. Functionalities provided in the API 11 can be divided into two main groups: (1) managing contextual relationships and (2) inferencing contextual relationships. API 11 such as create and remove context, link context to ontology definitions, add or remove resources and interrelationships in or from context are functionalities for managing contextual relationship while retrieve resource relationships requires Context Manager to inference the existing contextual relationships.

When a create context request is received, Context Engine 10 allows a Context to be created with an option to be associated with given an array of parent contexts that forms a hierarchy. In this case, relationship facts in any context are also visible in its descendant contexts. That is to say, relationships valid in one context should also hold in a nested context. If a delete context request is received, the specified context and its relationships with all related contexts will be deleted. Contexts can be linked to ontology definitions if needed to provide detail description. Context engine 10 further allows resources and relationships to be added to or removed from a context. If new resources and relationships are added to a context, all its descendant contexts will be able to see the change.

Ontologies are used to externalize context models and make it easier to customize applications, without having to modify the core application logic. Ontology is a specification of conceptualization, providing a standard vocabulary to describe things that exist in some domain, their properties and their relationships to each other. In managing the contexts and its relationships with other contexts and resources, Context Engine 10 uses ontology semantics to describe contextual relationships. These relationships are then persisted in context store. Relational databases or document repositories or teamrooms are examples of context stores. Context stores are loosely coupled with Context Engine 10 via each adapter in a distributed computing environment. In this example, Context Engine 10 is linked to three context stores: Context Store $16_1$, Context Store $16_2$ and Context Store $16_3$. During runtime, Context Engine 10 can access contextual relationship data from connected context stores when needed.

Leveraging the capabilities of the ontology manager 13, Context Manager answers queries about contextual relationships. When context engine 10 receives a request retrieve resource relationships through the API 11, it queries the ontology manager 13 to get a complete set of resource relationships for a given context. The ontology manager 13 then interprets ontology semantics and derives new facts and returns the result set of relationships the context engine 10. In case of hierarchical contextual relationships, ontology manager 13 may perform aggregation of contexts to derive a complete set of related resources for a given context or resource and return it to Context Engine 10 as result of the query.

Figure 2:
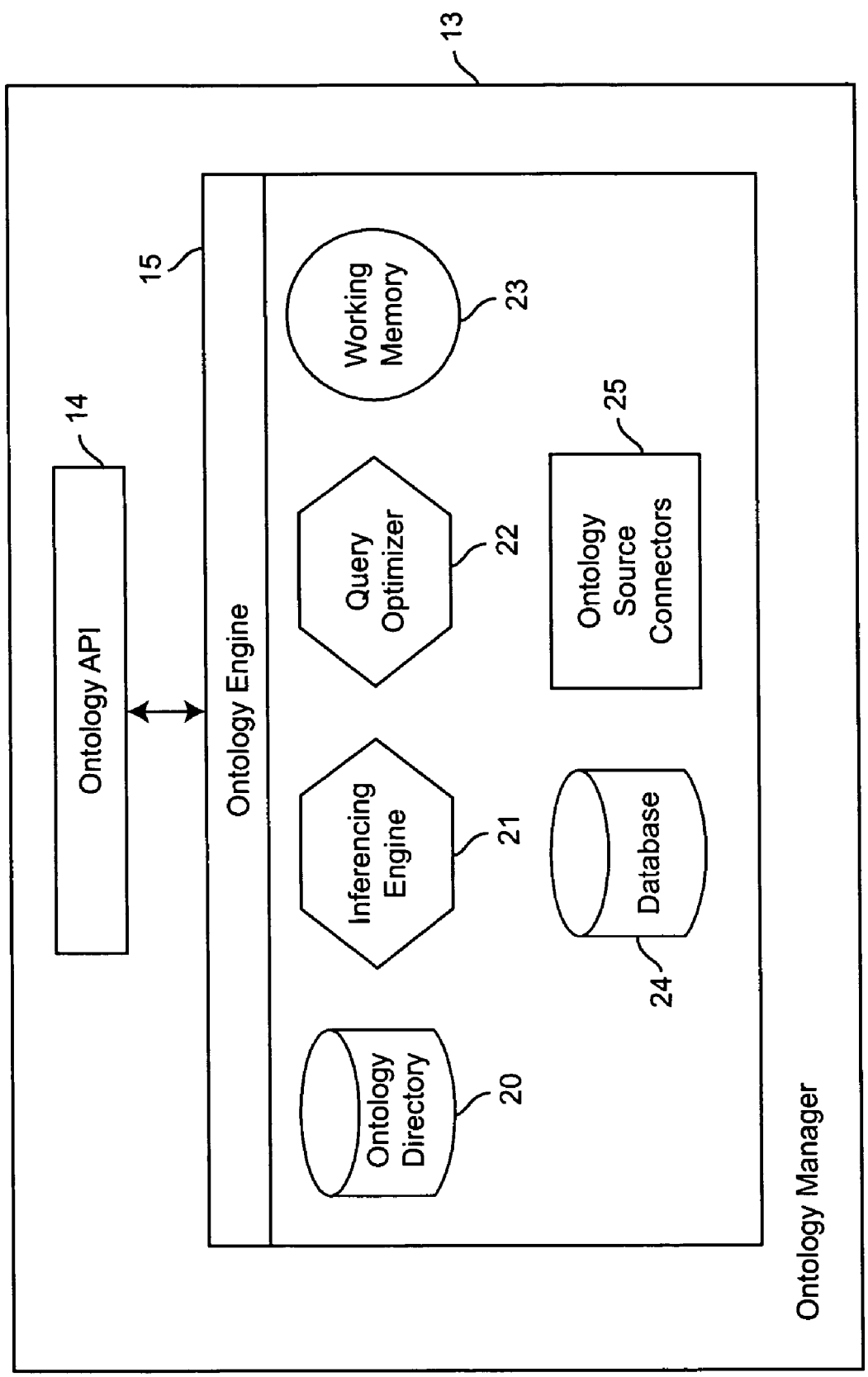
FIG. 2 is a schematic overview of the Ontology Manager.
Figure 3:
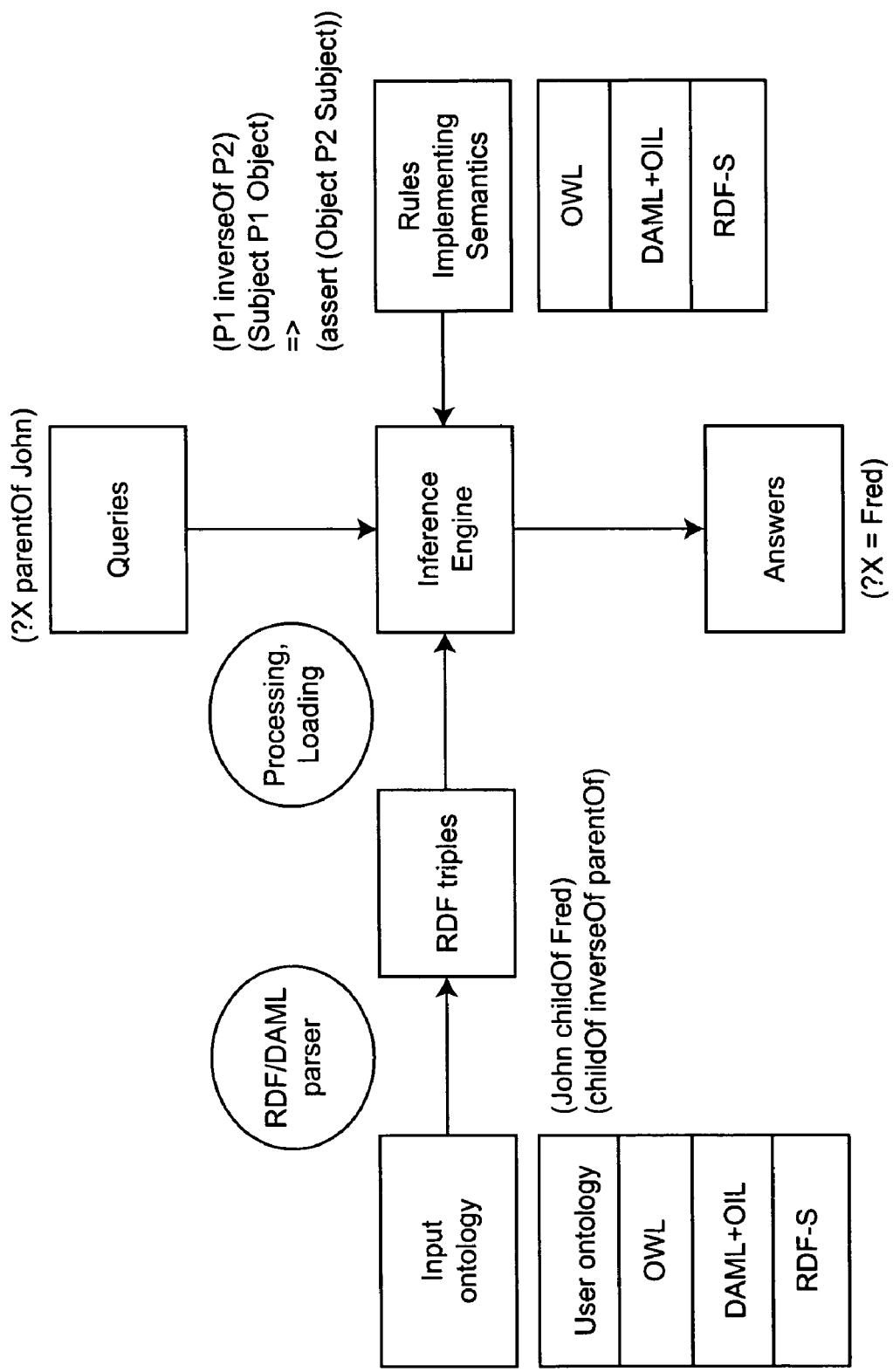
FIG. 3 is a block diagram illustrating the operation of the Ontology Manager.

FIG. 2 shows the schematic overview of the ontology manager 13. Ontology Manager 13 consists of the ontology API 14 and an ontology engine 15. Ontology manager 13 provides programming interfaces and query processing. Ontology engine API 14 is a set of Java API, which is the ontological equivalent of the Java Data Base Connector (JDBC). Unlike JDBC, ontology API 14 provides implicit connections to a default ontology that would include the top-level definitions of XML-based ontology languages such as OWL, DMAL+OIL, RDF and XML. These definitions are required in order to process any ontological information. Conceptually, the requester, Context Engine 10 in this case, interacts with the ontology API 14 that provides high-level access to ontology resources and the ontology engine 15.

The ontology engine 15 consists of a number of components: a local ontology directory 20, an inferencing engine 21, a working memory 23, a query optimizer 22 and a set of connectors 25 and infrastructure needed to support ontology management. Details of each is explained below:

Ontology Directory 20: This component provides the meta-level information about which ontologies are available to the ontology engine 15. By default, the ontology directory 20 will need to contain the references to the top-level definitions of RDF, RDF Schema, XML Schema and similar definitions for the set of XML-based ontology languages supported. In addition, the ontology directory may contain deployment information that gives additional sources of ontology information. For each ontology source, the directory will need to store the URI, but may additionally store information about the contents of the ontology source to aid in query optimization.

Working Memory 23: This is a virtual memory space that stores the current ontologies.

Inferencing Engine 21: The inferencing engine 21 provides a mechanism for interpreting the semantics of an ontology language, represented as a set of language specific rules. The rules are used to answer queries, when the requested fact is not immediately available, but must be inferred from available facts. For example, if the application requests the childrenOf an individual, but the working memory only contains parentOf relations, the inferencing engine can use the inverse property statements about childrenOf and parentOf to identify the correct response.

Query Optimizer 22: For applications that connect to large databases and/or ontologies, it will not be feasible to load the entire set of available information into working memory 23. Instead ontology engine 15 will query the ontology source for appropriate information as needed. In addition, the task of the query optimizer is to not only optimize the retrieval of information form ontology source, but also coordinate queries that span multiple sources.

Ontology source connectors 25: These provide a mechanism for reading, querying, and writing ontology information to persistent storage. The simplest connector is the file connector that is used to persist information to the local file system. In addition, there will be connectors for storing ontological information in remote servers. The connectors are also used to implement caching of remote information to improve performance and reliability.

Database 24: Provides a mechanism for storing assertion in persistent storage if requested The ontology engine 15 provides mechanisms for loading ontologies from various sources, for locally creating, modifying and persisting ontologies query. The rules derived are: (?X inverseOf ?Y) and (?A ?X ?B), then assert (?B ?Y ?A). Note that (?) denotes a transitive closure. Then a query "Who is the parent of John" will be translated as the statement (?X parentOf John). Inferencing engine 21 is able to process this query by interpreting the asserted facts from the working memory 23 to generate an answer (?X=Fred), which means "Fred is the parent of John".

Using ontology manager 13, the Context Manager is able to understand ontologies written in DAML+OIL, accept assertions on resource relationships, and process queries against a specific context.

Three forms of queries on contextual relationships are supported. The first form, matchResource, is based on the metaphor of pattern matching. Every relationship can be represented as a three-element tuple: <subject, predicate, object>. A pattern is specified by supplying any two of the three elements, and matchResource returns the resources that match the pattern in a given context. The other two forms of queries, retrieveDirectRelevantResources and retrieveRelevantResources are best explained when the context, and the edges denote the interrelationships between linked resources. The query form retrieveDirectRelevantResources returns the resources of desired types that are directly linked to working set items via one of the specified relationships. The query form retrieveRelevantResources is a closure of retrieveDirectRelevantResources. It returns the resources of desired types that are linked to working set items via a path of specified relationships.

Internally, the Context Manager defines context ontology. The context ontology defines classes Context and Artifact, relationships between contexts (i.e., parentOf, childOf), and relationships between artifacts and contexts (i.e., inWorkingSetOf, hasWorkingSetItem). A context is implemented as a DAML+OIL model in ontology engine 15, with linkage to all models that represent parent contexts, separate from the application logic. This way, most functions in the context manager API 11 can be mapped to ontology engine 15 retrieveDirectRelevantReources and retrieveRelevantResources operations in a straightforward manner. The implementation of these two operations makes use of three terms defined in the context ontology: a transitive property relatesTo, a property targetLink and a class TargetType.

Different ontologies maybe used for different contexts. The use of ontology enhances the expressiveness of the context model and makes it possible to deduce new relationships from explicitly asserted relationship facts. It is also possible to inference the transitive dependancies between resources in a context, which is essential to many business applications.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for managing and inferencing contexts and contextual relationships between resources comprising:
    an application program interface (API), the API receiving queries about contextual relationships including creating or removing context, link context and ontology definitions, add or remove resources and interrelationships in and from context, and retrieve resource relationships;
    a context engine, coupled to receive and process requests from the API;
    an ontology manager accessible by the context engine and adapted to interpret ontology semantics and answer queries about contextual relationships; and
    one or more context stores accessible by the context engine, the context engine using ontology semantics derived from the ontology manager to describe contextual relationships and storing the contextual relationships in one or more of the plurality of context stores, contextual relationship data stored in the context stores being accessed by the context engine to answer queries received from the API, wherein said ontology manager is operationally coupled with a working memory that holds at least part of relationship facts from said one or more context stores and said contexts provide one or more mechanisms for recording a current status of one or more resources by representing relationships among objects, roles, and processes explicitly or implicitly used in said resources.

2. The apparatus recited in claim 1, wherein said said resources comprise one or more computer programs.

3. The apparatus recited in claim 1, wherein said contexts have one or more relationships with one or more of other contexts, including inclusion, exclusion, sharing, and nesting.

4. The apparatus recited in claim 1, wherein said contextual relationships represent one or more relationships among objects, roles, and processes which are defined in one or more said contexts and explicitly or implicitly used in one or more computer programs.

5. The apparatus recited in claim 4, wherein said contextual relationships include generalization, specialization, transitive dependency, inversion, symmetry, and arbitrary user-defined relationships.

6. The apparatus recited in claim 1, wherein said API includes operations for creating contexts, optionally as children of other contexts.

7. The apparatus recited in claim 1, wherein said API includes operations for asserting relationships within a specific context.

8. The apparatus recited in claim 1, wherein each of said one or more context stores is operationally coupled with an adapter that operates on a corresponding context store.

9. The apparatus recited in claim 1, further comprising one or more ontology directories for recording meta-level information about which of said one or more context stores are available to the ontology manager.

10. The apparatus recited in claim 1, further comprising one or more ontology source connectors for providing mechanisms for importing context stores recorded in one or more persistent storage media including local file system, remote servers, database systems, and Web servers.

11. The apparatus recited in claim 10, further comprising one or more cache memories for storing context relationship information from remote context stores for improving performance and reliability.

12. The apparatus recited in claim 1, further comprising a query optimizer accessed by the context engine to optimize queries from said interface.

13. A method for managing and inferencing contexts and contextual relationships, comprising the steps of:
    receiving definitions and queries about contextual relationships through an application program interface (API), the API receiving queries about contextual relationships including creating or removing context, link context and ontology definitions, add or remove resources and interrelationships in and from context, and retrieve resource relationships;
    accessing an ontology manager which interprets ontology semantics and answers queries about relationships;
    recording contextual relationships in one or more context stores;
    accessing data stored in said one or more context stores in response to queries received by the API; and
    answering queries received through said API about contextual relationships wherein said contexts provide one or more mechanisms for recording a current status of one or more resources by representing relationships among objects, roles, and processes explicitly or implicitly used in said resources.

14. The method recited in claim 13, wherein prior to said answering step, the further step of optimizing said queries.

15. The method recited in claim 13, wherein said answering step further comprises the steps of:
    copying relationship facts from said one or more context stores to a working memory; and
    inferencing using the relationship facts stored in said working memory.

16. The method recited in clam 13, wherein said resources comprise one or more computer programs.

17. The method recited in claim 13, wherein said contexts have one or more relationship with one or more of other contexts, including, but not limited to, inclusion, exclusion, sharing, and nesting.

18. The method recited in claim 13, wherein said contextual relationships represent one or more relationships among objects, roles, and processes which are defined in one or more said contexts and explicitly or implicitly used in one or more computer programs.

19. The method recited in claim 18, wherein said contextual relationships include, but not are limited to, generalization, specialization, transitive dependency, inversion, symmetry, and arbitrary user-defined relationships.

* * * * *